(12) United States Patent
Wang et al.

(10) Patent No.: US 10,008,049 B2
(45) Date of Patent: Jun. 26, 2018

(54) POSITIVE CRANKCASE VENTILATION SYSTEM DIAGNOSTIC SYSTEMS AND METHODS

(71) Applicant: GM Global Technology Operations LLC, Detroit, MI (US)

(72) Inventors: Wenbo Wang, Novi, MI (US); Layne K. Wiggins, Dexter, MI (US); David R. Kosmalski, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 15/059,452

(22) Filed: Mar. 3, 2016

(65) Prior Publication Data
US 2017/0256103 A1    Sep. 7, 2017

(51) Int. Cl.
| | | |
|---|---|---|
| *G07C 5/08* | (2006.01) | |
| *F01M 13/00* | (2006.01) | |
| *B60W 10/00* | (2006.01) | |
| *F02D 41/22* | (2006.01) | |
| *F01M 11/10* | (2006.01) | |

(52) U.S. Cl.
CPC .......... *G07C 5/0808* (2013.01); *B60W 10/00* (2013.01); *F01M 11/10* (2013.01); *F01M 13/00* (2013.01); *F02D 41/22* (2013.01); *G07C 5/0816* (2013.01); *G07C 5/0841* (2013.01); *F01M 2013/0083* (2013.01); *F02D 2200/025* (2013.01); *F02D 2250/08* (2013.01)

(58) Field of Classification Search
CPC .......... B60T 13/66; B60T 17/22; B60T 13/07; B60W 2710/0688; B60W 10/00; B60Y 2306/03; F01M 13/00; F01M 2001/165; F01M 2013/0083; F01M 11/10; F02D 2250/08; F02D 2250/11; F02D 41/04; F02D 41/30; F02D 35/00; F02D 41/042; F02D 41/062; F02D 41/18; F02D 2200/021; F02D 2200/0414; F02D 2200/1015; F02D 2200/501; F02D 2011/108; F02D 41/22; F02D 2200/025; G07C 5/0808; G07C 5/0816; G07C 5/0841
USPC ...... 60/605.2, 327–328; 123/568.21, 568.22; 701/108, 102, 103, 110
See application file for complete search history.

(56) References Cited

U.S. PATENT DOCUMENTS

| | | | | |
|---|---|---|---|---|
| 6,101,442 A | * | 8/2000 | Lewandowski | ........... F01L 1/46 |
| | | | | 701/114 |
| 2012/0048249 A1 | * | 3/2012 | Liimatta | .............. F01M 11/064 |
| | | | | 123/574 |

(Continued)

*Primary Examiner* — Nga X Nguyen

(57) ABSTRACT

A fault diagnostic system of a vehicle includes a noise module that determines a noise value based on a plurality of differences between samples of a pressure signal generated by a pressure sensor located in a positive crankcase ventilation (PCV) system of an engine. A signal module determines a signal value based on the samples of the pressure signal generated by the pressure sensor located in the PCV system of the engine. A diagnostic value module determines a diagnostic value based on one of: (i) a product of the noise value and the signal value; and (ii) a sum based on the noise value and the signal value. A fault module selectively diagnoses a fault in the PCV system based on the diagnostic value and generates a malfunction indicator within a passenger cabin of the vehicle in response to the diagnosis of the fault in the PCV system.

20 Claims, 4 Drawing Sheets

(56) References Cited

U.S. PATENT DOCUMENTS

2014/0081549 A1\* 3/2014 Rollinger ............... F01M 13/00
                                                              701/101
2014/0137544 A1\* 5/2014 Pursifull ................. B60T 13/66
                                                              60/327

\* cited by examiner

POSITIVE CRANKCASE VENTILATION SYSTEM DIAGNOSTIC SYSTEMS AND METHODS

FIELD

The present disclosure relates to internal combustion engines and more particularly to systems and methods for diagnosing faults in a positive crankcase ventilation (PCV) system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through a throttle valve. The air in the intake manifold is distributed to a plurality of cylinders and combined with fuel to create an air/fuel (A/F) mixture. The A/F mixture is combusted within the cylinders to drive pistons which rotatably turn a crankshaft and generate drive torque. The drive torque is transferred to a driveline of a vehicle via a transmission. Exhaust resulting from combustion may be expelled from the cylinders into an exhaust manifold and treated by an exhaust treatment system before being released into the atmosphere.

Gas (e.g., air, fuel, and/or exhaust) within a cylinder may enter a crankcase of the cylinder past a piston ring of the cylinder. Gas that enters the crankcase may also be referred to as blow-by vapor. The crankcase includes the crankshaft which is connected to the piston. The crankcase also includes oil for lubricating the movement of the crankshaft and the piston and other moving parts. Gas within the crankcase may contaminate the oil and is generally vented from the crankcase to decrease pressure within the crankcase.

SUMMARY

In a feature, a fault diagnostic system of a vehicle is described. A noise module determines a noise value based on a plurality of differences between samples of a pressure signal generated by a pressure sensor located in a positive crankcase ventilation (PCV) system of an engine. A signal module determines a signal value based on the samples of the pressure signal generated by the pressure sensor located in the PCV system of the engine. A diagnostic value module determines a diagnostic value based on one of: (i) a product of the noise value and the signal value; and (ii) a sum based on the noise value and the signal value. A fault module selectively diagnoses a fault in the PCV system based on the diagnostic value and generates a malfunction indicator within a passenger cabin of the vehicle in response to the diagnosis of the fault in the PCV system.

In further features, the fault in the PCV system includes at least one of: one of a leak in the PCV system; and a disconnection of the PCV system from at least one of a crankcase of the engine and an air intake system of the engine.

In further features, the signal module sets the signal value based on an average of the samples of the pressure signal generated by the pressure sensor located in the PCV system.

In further features, the noise module sets the noise value based on an average of the differences between the samples of the pressure signal generated by the pressure sensor located in the PCV system.

In further features, the fault module diagnoses the fault in the PCV system when the diagnostic value is one of: greater than a first predetermined value; and less than a second predetermined value.

In further features, a gain module determines a gain value based on an average engine speed. The diagnostic value module determines the diagnostic value based on a product of the noise value, the signal value, and the gain value.

In further features, a gain module determines a gain value based on an average engine speed. The diagnostic value module determines the diagnostic value based on a sum of (i) the signal value and (ii) a product of the noise value and the gain value.

In further features, the noise module: determines squares of the differences between the samples of the pressure signal generated by the pressure sensor located in the PCV system; determines a second sum of the squares of the differences; and sets the noise value based on a square root of the second sum.

In further features, the noise module sets the noise value based on absolute values of the differences between the samples of the pressure signal generated by the pressure sensor located in the PCV system.

In further features, in response to the diagnosis of the fault in the PCV system, the fault module further stores a diagnostic trouble code (DTC) in memory, the DTC being associated with the fault in the PCV system.

In a feature, a fault diagnostic method for a vehicle is described. The fault diagnostic method includes: determining a noise value based on a plurality of differences between samples of a pressure signal generated by a pressure sensor located in a positive crankcase ventilation (PCV) system of an engine; determining a signal value based on the samples of the pressure signal generated by the pressure sensor located in the PCV system of the engine; and determining a diagnostic value based on one of: (i) a product of the noise value and the signal value; and (ii) a sum based on the noise value and the signal value. The fault diagnostic method further includes: selectively diagnosing a fault in the PCV system based on the diagnostic value; and generating a malfunction indicator within a passenger cabin of the vehicle in response to the diagnosis of the fault in the PCV system.

In further features, the fault in the PCV system includes at least one of: one of a leak in the PCV system; and a disconnection of the PCV system from at least one of a crankcase of the engine and an air intake system of the engine.

In further features, setting the signal value includes setting the signal value based on an average of the samples of the pressure signal generated by the pressure sensor located in the PCV system.

In further features, setting the noise value includes setting the noise value based on an average of the differences between the samples of the pressure signal generated by the pressure sensor located in the PCV system.

In further features, diagnosing the fault in the PCV system includes diagnosing the fault in the PCV system when the diagnostic value is one of: greater than a first predetermined value; and less than a second predetermined value.

In further features, the fault diagnostic method further includes: determining a gain value based on an average engine speed, wherein determining the diagnostic value includes determining the diagnostic value based on a product of the noise value, the signal value, and the gain value.

In further features, the fault diagnostic method further includes: determining a gain value based on an average engine speed, wherein determining the diagnostic value includes determining the diagnostic value based on a sum of (i) the signal value and (ii) a product of the noise value and the gain value.

In further features, setting the noise value includes: determining squares of the differences between the samples of the pressure signal generated by the pressure sensor located in the PCV system; determining a second sum of the squares of the differences; and setting the noise value based on a square root of the second sum.

In further features, setting the noise value includes setting the noise value based on absolute values of the differences between the samples of the pressure signal generated by the pressure sensor located in the PCV system.

In further features, the fault diagnostic method further includes, in response to the diagnosis of the fault in the PCV system, storing a diagnostic trouble code (DTC) in memory, the DTC being associated with the fault in the PCV system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Positive crankcase ventilation (PCV) systems are implemented to vent gas from a crankcase of an engine to an air intake system. A PCV system is connected at one end to the crankcase and at the other end to the air intake system. The PCV system allows gas to flow from the crankcase to the air intake system when a pressure within the crankcase is greater than a pressure where the PCV system is connected to the air intake system.

A leak in the PCV system, a break in the PCV system, or a disconnection of at least one end of the PCV system may allow gas from the crankcase to escape to atmosphere. A leak, break, or disconnection of the PCV system may also allow for unexpected air into the air intake system. A PCV pressure sensor measures a pressure within the PCV system between the crankcase and the air intake system.

A diagnostic module diagnoses a fault (e.g., a leak, break, or disconnection) in the PCV system based on measurements from the PCV pressure sensor. More specifically, the diagnostic module determines a noise value corresponding to a noise component of the signal generated by the PCV pressure sensor and a signal value corresponding to a signal component of the signal generated by the PCV pressure sensor. Signal to noise ratio (SNR) may refer to a ratio (or quotient) of signal to noise of a signal. The diagnostic module determines a diagnostic value based on one of: (i) a product of the signal value and the noise value; and (ii) a sum based on the signal value and the noise value. This may be referred to as SNP (e.g., Signal to Noise Product or Signal to Noise Plus). The diagnostic module diagnoses the fault in the PCV system when the diagnostic value is greater than a predetermined maximum value or less than a predetermined minimum value. In this sense, the predetermined maximum and minimum values are used as thresholds.

When the fault is present in the PCV system, the diagnostic module sets a diagnostic trouble code (DTC) associated with the fault in the PCV system in memory. Additionally or alternatively, the diagnostic module may illuminate a malfunction indicator light and/or take one or more other remedial actions when the fault is present in the PCV system.

Figure 1:
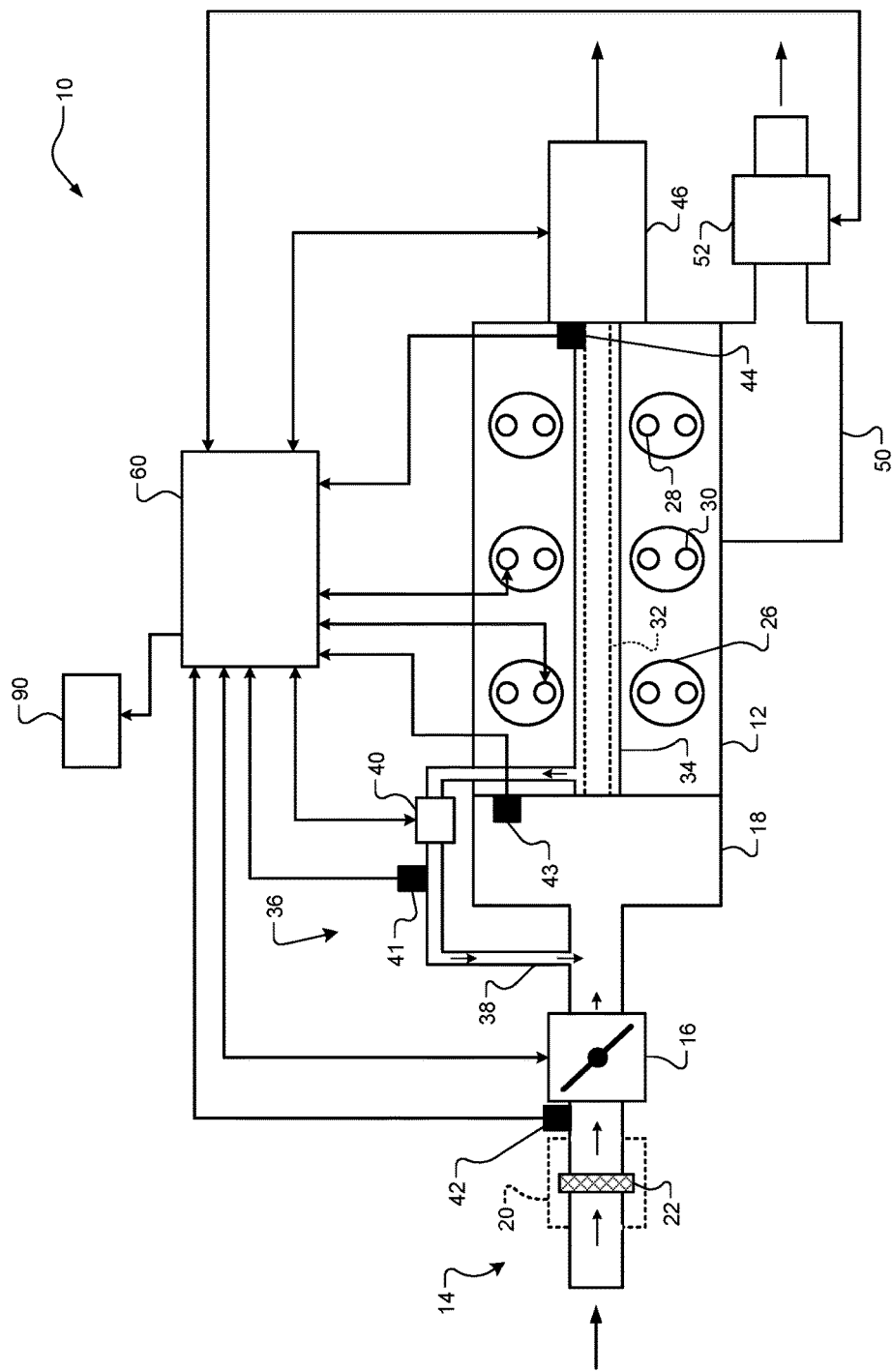
FIG. 1 is a functional block diagram of an example engine system.

Referring now to FIG. 1, an engine system 10 includes an engine 12. The engine 12 may be a spark ignition (SI) engine, a compression ignition (CI) engine, a homogeneous charge compression ignition (HCCI) engine, or another type of engine. While the example of the engine 12 being naturally aspirated is shown and will be discussed, the present application is also applicable to engines including one or more boost devices, such as one or more turbochargers and/or superchargers. The engine system 10 may be implemented in a hybrid vehicle and include one or more electric motors and a battery system.

The engine 12 draws air into an air intake system 14 through an air filter housing 20 and an air filter 22. The air filter 22 filters the air to remove particles from the air flowing into the engine 12. Airflow may be regulated by a throttle valve 16. For example, the throttle valve 16 may be electrically controlled using electronic throttle control (ETC).

Air in an intake manifold 18 is distributed to a plurality of cylinders 26. While six cylinders are shown, the engine 12 may include less than six cylinders or more than six cylinders. Fuel injectors 28 inject fuel into intake ports of the cylinders 26 (for port fuel injection) and/or directly into the cylinders 26 (for direct fuel injection). One fuel injector may be provided for each cylinder.

Spark plugs 30 may ignite the A/F mixture within the cylinders 26 to drive pistons of the cylinders 26, respectively. The pistons rotatably drive a crankshaft 32 and generate drive torque. In some types of engines, the spark plugs 30 may be omitted. The crankshaft 32 is housed within a crankcase 34 that includes oil for lubrication of moving parts of the engine 12.

A positive crankcase ventilation (PCV) system 36 vents gas from the crankcase 34 to the air intake system 14 at a location downstream from the air filter 22. While the example of the PCV system 36 venting gas to between the throttle valve 16 and the intake manifold 18 is provided, the PCV system 36 may vent gas from the crankcase 34 to the intake manifold 18, upstream of a compressor of a boost device, or another location between the air filter 22 and the intake manifold 18.

The PCV system 36 includes a PCV tube 38 that may be connected at one end to the crankcase 34 and at the other end to the air intake system 14. The PCV system 36 may also include a PCV valve or another flow or pressure regulator valve 40 ("pressure regulator valve") that regulates the flow of gas from the crankcase 34 to the air intake system 14. For example only, the pressure regulator valve 40 may be a one-way valve that opens when a pressure within the crankcase 34 is greater than a pressure within the air intake system 14 or greater than a predetermined pressure. PCV system is a general term used to describe a blow-by management system in engines where blow-by vapor may be created. The PCV system 36 can also be referred to as a blow-by system.

The PCV system 36 may also include an air/oil separation system that separates oil from gas such to minimize or prevent oil flow to the air intake system 14. The PCV system 36 may also include a breather tube that introduces additional fresh air into the crankcase 34, for example, to improve air circulation. In various implementations, the PCV tube 38 may allow for two way flow and function additionally as a breather tube.

A PCV pressure sensor 41 measures a pressure within the PCV tube 38 and generates a PCV pressure signal based on the pressure measured. The PCV pressure sensor 41 may be implemented at a location between the pressure regulator valve 40 and the air intake system 14, as shown in FIG. 1. Alternatively, the PCV pressure sensor 41 may be implemented at a location between the pressure regulator valve 40 and the crankcase 34.

A mass air flowrate (MAF) sensor 42 measures a mass flowrate of air into the engine 12 and generates a MAF signal accordingly. A manifold absolute pressure (MAP) sensor 43 measures an absolute pressure within the intake manifold 18 and generates a MAP signal accordingly. In various implementations, vacuum within the intake manifold 18 may be measured. An engine speed sensor 44 measures a rotational speed of the crankshaft 32. The rotational speed of the crankshaft 32 will be referred to as engine speed. The engine speed sensor 44 may measure the engine speed in revolutions per minute (RPM).

A transmission 46 transfers drive torque from the crankshaft 32 to a driveline (e.g., wheels) of a vehicle. In some implementations, the transmission 46 may be coupled to the crankshaft 32 via a fluid coupling, such as a torque converter. Exhaust gas resulting from combustion may be expelled from the cylinders 26 into an exhaust manifold 50. An exhaust treatment system (ETS) 52 may treat the exhaust gas before releasing the exhaust gas into the atmosphere.

An engine control module (ECM) 60 controls operation of the engine system 10 based on driver input and measurements provided by various sensors. For example, the ECM 60 may control opening of the throttle valve 16, fuel injection, spark timing, phasing and/or lift of intake and exhaust valves, boost provided by a boost device, exhaust gas recirculation (EGR), and other engine operating parameters.

Figure 2:
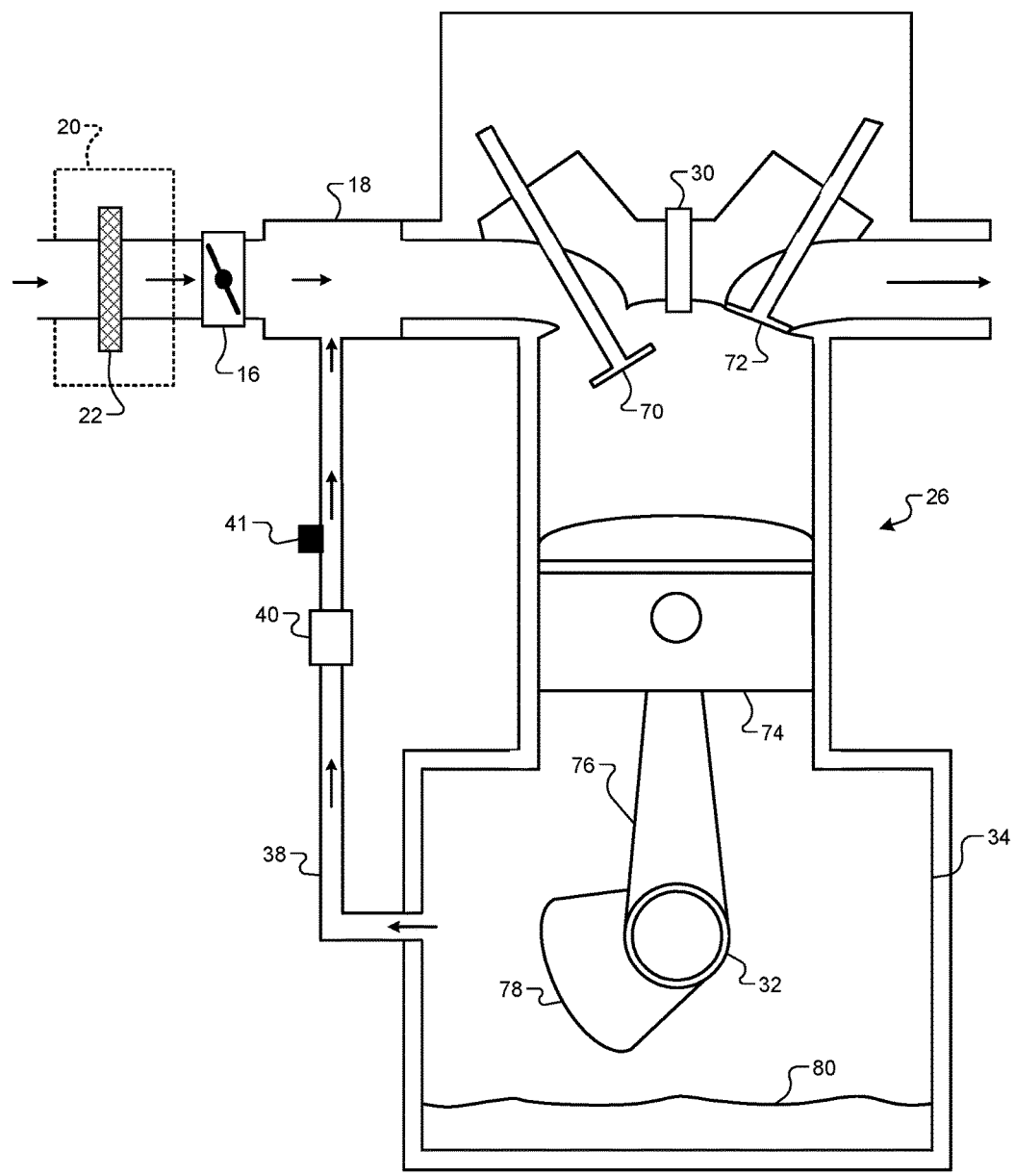
FIG. 2 is an example cross-sectional view of a cylinder.

Referring now to FIG. 2, an example of one of the plurality of cylinders 26 is shown. The cylinder 26 draws in air from the intake manifold 18 via an intake valve 70. Fuel may be injected, for example, into the air as the air flows into the cylinder 26 or directly into the cylinder 26. The cylinder 26 expels exhaust gas produced during combustion into the exhaust manifold 50 via an exhaust valve 72. The intake valve 70 and the exhaust valve 72 may be actuated, for example, by one or more camshafts (not shown).

The cylinder 26 includes a piston 74. Combustion of air and fuel within the cylinder 26 (e.g., using the spark plug 30) drives the piston 74. The piston 74 is connected to the crankshaft 32 by a connecting rod 76. The force imposed on the piston 74 during combustion drives rotation of the crankshaft 32. The crankshaft 32 may be connected to a counterweight 78. The crankshaft 34 houses the various components of the engine 12. For example, the crankcase 34 includes oil 80 that lubricates the moving parts of the engine 12.

Gas from the cylinder 26 may enter the crankcase 34 past a piston ring. Gas from the cylinders may contaminate the oil 80 and increase a pressure in the crankcase 34. The PCV system 36, however, vents gas from the crankcase 34 to decrease the pressure within the crankcase 34. More specifically, the PCV tube 38 vents gas from the crankcase 34 to the air intake system 14. The pressure regulator valve 40 may open when the pressure within the crankcase 34 is greater than a predetermined pressure or is greater than a pressure (e.g., by at least a predetermined pressure) at the location where the PCV tube 38 connects to the air intake system 14.

Referring back to FIG. 1, the ECM 60 diagnoses whether a fault is present in the PCV system 36 based on samples of the signal generated by the PCV pressure sensor 41. The fault may be, for example, a break in the PCV system 36, a leak in the PCV system 36, or a disconnection of the PCV system 36 from the crankcase 34 or the air intake system 14. The fault in the PCV system 36 may allow gas to escape from the crankcase 34 to atmosphere.

When the fault is present in the PCV system 36, the ECM 60 stores a diagnostic trouble code (DTC) in memory. The DTC is associated with the fault in the PCV system 36. The ECM 60 may illuminate a malfunction indicator light (MIL) 90, display an indicator on a display, or generate another suitable malfunction indicator within a passenger cabin of the vehicle. Illumination of the MIL 90 may indicate to passengers to seek vehicle service. A vehicle service technician may access the memory and may quickly determine that one or more faults may be present in the PCV system 36 based upon the DTC being stored in the memory and the association between the DTC and the fault in the PCV system 36.

Figure 3:
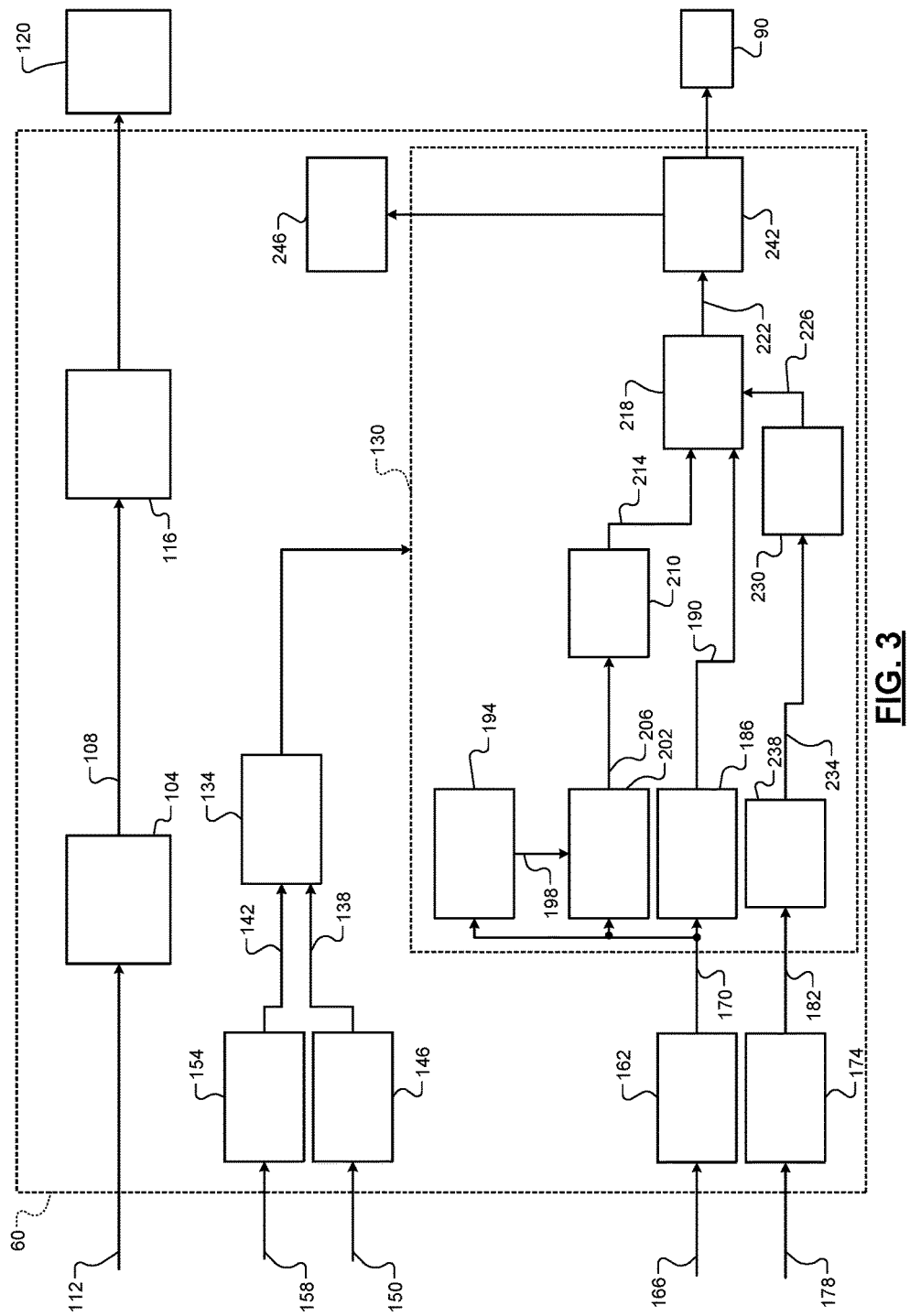
FIG. 3 is a functional block diagram of an example portion of an engine control module.

FIG. 3 includes a functional block diagram of an example portion of the ECM 60. The ECM 60 includes a driver torque module 104 that determines a driver torque request 108 based on driver input 112. The driver input 112 may include, for example, an accelerator pedal position (APP), a brake pedal position (BPP), and/or cruise control input. In various implementations, the cruise control input may be provided by an adaptive cruise control system that attempts to maintain at least a predetermined distance between the vehicle and objects in a path of the vehicle. The driver torque module 104 determine the driver torque request 108 based on one or more lookup tables that relate the driver inputs to driver torque requests. The APP and BPP may be measured using one or more APP sensors and BPP sensors, respectively.

An actuator control module 116 controls one or more actuators 120 of the engine 12 based on the driver torque request 108. For example, based on the driver torque request 108, the actuator control module 116 may control opening of the throttle valve 16, timing of spark provided by spark plugs, timing and amount of fuel injected by fuel injectors, cylinder actuation/deactivation, intake and exhaust valve phasing and/or lift, output of one or more boost devices (e.g., turbochargers, superchargers, etc.), opening of an EGR valve, and/or one or more other engine actuators.

The ECM 60 also includes a diagnostic module 130. An enabling/disabling module 134 enables and disables the diagnostic module 130. For example, the enabling/disabling module 134 may enable the diagnostic module 130 when both (i) changes between consecutive MAFs 138 are less than a predetermined flowrate for greater than a predetermined period (or a predetermined number of samples) and (ii) changes between consecutive MAPs 142 are less than a predetermined pressure for greater than the predetermined period (or the predetermined number of samples). The enabling/disabling module 134 may disable the diagnostic module 130 when either or both of (i) and (ii) is not satisfied. While the example of enabling and disabling based on changes in MAF and MAP is described, the enabling/disabling module 134 may enable and disable the diagnostic module 130 based on one or more other criteria, such as the MAP 142, intake manifold vacuum, the MAF 138, and/or engine speed. For example, the enabling/disabling module 134 may enable the diagnostic module 130 when the MAF 138 is between predetermined maximum and minimum MAF values, the MAP 142 (or intake manifold vacuum) is between predetermined minimum and maximum pressure values.

A first sampling module 146 samples a MAF signal 150 generated by the MAF sensor 42 at a predetermined sampling rate and digitizes the samples to produce the MAFs 138. The first sampling module 146 may also buffer, filter, and/or perform one or more functions before outputting the MAFs 138. A second sampling module 154 samples a MAP signal 158 generated by the MAP sensor 43 at a predetermined sampling rate and digitizes the samples to produce the MAPs 142. The second sampling module 154 may also buffer, filter, and/or perform one or more functions before outputting the MAPs 142. The predetermined sampling rate may be time based (e.g., every predetermined period) or crankshaft position based (e.g., every predetermined number of degrees of crankshaft rotation).

A third sampling module 162 samples a PCV pressure signal 166 generated by the PCV pressure sensor 41 at a predetermined sampling rate and digitizes the samples to produce PCV pressures 170. The third sampling module 162 may also buffer, filter, and/or perform one or more functions before outputting the PCV pressures 170.

A fourth sampling module 174 samples an engine speed 178 generated using the engine speed sensor 44 at a predetermined sampling rate and digitizes the samples to produce engine speeds 182. The fourth sampling module 174 may also buffer, filter, and/or perform one or more functions before outputting the engine speeds 182. In various implementations, the third and fourth sampling modules 162 and 174 may sample and output the PCV pressures 170 and the engine speeds 182 at the same rate. The predetermined sampling rate may be time based (e.g., every predetermined period) or crankshaft position based (e.g., every predetermined number of degrees of crankshaft rotation).

When enabled, the diagnostic module 130 diagnoses whether a fault is present in the PCV system 36 based on a plurality of the PCV pressures 170. The modules of the diagnostic module 130 function as described below when the diagnostic module 130 is enabled.

A signal module 186 receives the PCV pressures 170. The signal module 186 determines a signal value (e.g., in kPa) 190 based on a plurality of the PCV pressures 170. For example, the signal module 186 may set the signal value 190 based on or equal to an average of a predetermined number of consecutive ones of the PCV pressures 170. The signal module 186 may add the PCV pressures 170 to an accumulated PCV pressure as the PCV pressures 170 are generated. The signal module 186 may divide the accumulated PCV pressure by the predetermined number once the predetermined number of PCV pressures 170 have been generated to determine the average of the predetermined number of the PCV pressures 170. The signal module 186 resets the accumulated PCV pressure when the diagnostic module 130 is disabled.

A delay module 194 receives the PCV pressures 170. When one of the PCV pressures 170 is generated, the delay module 194 stores that one of the PCV pressures 170 for a predetermined period (corresponding to the predetermined sampling rate) and outputs a previous PCV pressure 198 from the predetermined period earlier. The delay module 194 includes or acts as a one-unit, first-in first-out (FIFO) buffer or a one-unit delay buffer. The previous PCV pressure 198 is the one of the PCV pressures 170 generated the predetermined period before the present one of the PCV pressures 170. When the diagnostic module 130 transitions from disabled to enabled, the delay module 194 may set the previous PCV pressure 198 to the first one of the PCV pressures 170 generated.

A difference module 202 determines PCV pressure differences 206. When one of the PCV pressures 170 is generated, the difference module 202 determines one of the PCV pressure differences 206 based on a difference between that one of the PCV pressures 170 and the previous PCV pressure 198. In this manner, the difference module 202 determines the PCV pressure differences 206 based on differences between consecutive ones of the PCV pressures 170. In various implementations, the difference module 202 may set a pressure difference based on an absolute value of a difference between the PCV pressure 170 and the previous PCV pressure 198.

A noise module 210 determines a noise value (e.g., in kPa) 214 based on a plurality of the PCV pressure differences 206. For example, the noise module 210 may set the noise value 214 based on or equal to an average of the predetermined number of the consecutive ones of the PCV pressure differences 206. The predetermined number of the PCV pressure differences 206 may be the same as the predetermined number of the PCV pressures 170 used to determine the signal value 190.

The noise module 210 may add the PCV pressure differences 206 to an accumulated PCV pressure difference as the PCV pressure differences 206 are generated. The noise module 210 may divide the accumulated PCV pressure difference by the predetermined number once the predetermined number of the PCV pressure differences 206 have been generated to determine the average of the predetermined number of the consecutive ones of the PCV pressure differences 206. The noise module 210 resets the accumulated PCV pressure difference when the diagnostic module 130 is disabled.

As another example, the noise module 210 may determine mathematical squares of each of the predetermined number of the consecutive ones of the PCV pressure differences 206 and sum the predetermined number of the squares. The noise module 210 may set the noise value 214 based on or equal to a mathematical square root of the sum of the predetermined number of the squares.

A diagnostic value module 218 determines a diagnostic value 222 based on either (i) a product of the noise value 214 and the signal value 190; or (ii) a sum involving the noise value 214 and the signal value 190. The diagnostic value 222 is used to determine whether the fault is present in the PCV system 36, as discussed further below.

As an example, the diagnostic value module 218 may set the diagnostic value 222 based on or equal to a product of the noise value 214, the signal value 190, and a gain value 226. As another example, the diagnostic value module 218 may set the diagnostic value 222 based on or equal to a sum of (i) the signal value 190 and (ii) a product of the noise value 214 and the gain value 226. The diagnostic value module 218 may also apply a filter, such as a low pass filter, to the value resulting from (i) or (ii) to produce the diagnostic value 222.

A gain module 230 determines the gain value 226 based on an average engine speed 234. For example, the gain module 230 may determine the gain value 226 using one of a function and a lookup table that relates average engine speeds to gain values.

An averaging module 238 determines the average engine speed 234 by averaging the predetermined number of consecutive ones of the engine speeds 182. The averaging module 238 may add the engine speeds 182 to an accumulated engine speed as the engine speeds 182 are generated. The averaging module 238 may divide the accumulated engine speed by the predetermined number once the predetermined number of the engine speeds 182 have been generated to determine the average of the predetermined number of the engine speeds 182. The averaging module 238 may reset the accumulated engine speed when the diagnostic module 130 is disabled.

A fault module 242 determines whether the fault is present in the PCV system 36 based on a comparison of the diagnostic value 222 and at least one predetermined value. For example, the fault module 242 may diagnose the fault in the PCV system 36 when the diagnostic value 222 is greater than a predetermined maximum value or less than a predetermined minimum value. The fault module 242 may diagnose that the fault is not present in the PCV system 36 when the diagnostic value 222 is between the predetermined maximum and minimum values. The presence of the fault may indicate that a leak or break is present in the PCV system 36 or that the PCV system 36 is disconnected from at least one of the air intake system 14 and the crankcase 34.

In the examples of determining the diagnostic value 222 based on the gain value 226 described above, the predetermined maximum and minimum values may be fixed predetermined values. In other example implementations, the diagnostic value 222 may be determined independently of the gain value 226, and the fault module 242 may determine the predetermined maximum and minimum values based on the average engine speed 234. For example, the diagnostic value module 218 may set the diagnostic value 222 equal to or based on one of (i) a product of the noise value 214 and the signal value 190; and (ii) a sum of the noise value 214 and the signal value 190. The diagnostic value module 218 may also apply a filter, such as a low pass filter, to the value resulting from (i) or (ii) to produce the diagnostic value 222. The fault module 242 may determine the predetermined maximum and minimum values, for example, using functions and/or lookup tables that relate average engine speeds to predetermined maximum and minimum values.

The fault module 242 takes one or more remedial actions when the fault is diagnosed in the PCV system 36. For example, the fault module 242 sets a predetermined diagnostic trouble code (DTC) associated with the fault in the PCV system 36 in memory 246. Additionally or alternatively, the fault module 242 illuminates the MIL 90 within the passenger cabin. One or more other remedial actions may additionally or alternatively be taken when the fault is diagnosed in the PCV system 36. For example, the actuator control module 116 may adjust one or more engine operating parameters when the fault is diagnosed.

Figure 4:
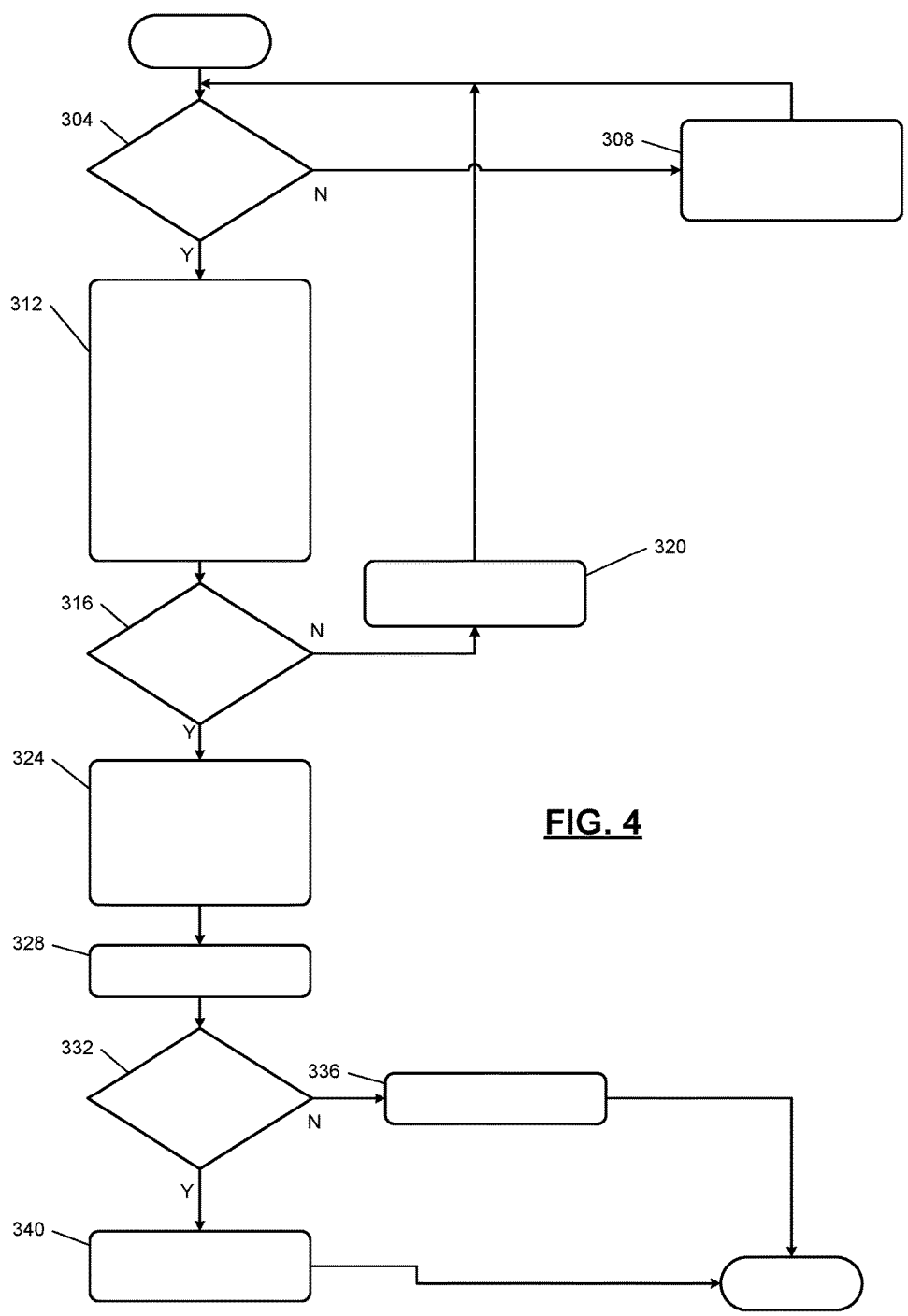
FIG. 4 is a flowchart depicting an example method of diagnosing faults in a positive crankcase ventilation (PCV) system.

FIG. 4 is a flowchart depicting an example method of diagnosing whether a fault is present in the PCV system 36. Control begins with 304 where the enabling/disabling module 134 may determine whether a change in the MAP 142 is less than a predetermined pressure and/or a change in the MAF 138 is less than a predetermined flowrate. As an alternative, the enabling/disabling module 134 may determine whether the MAP 142 (or intake manifold vacuum) and/or the MAF 138 are within predetermined ranges at 304. If 304 is false, control transfers to 308. If 304 is true, control continues with 312, which is discussed further below. At 308, the enabling/disabling module 134 disables the diagnostic module 130. The diagnostic value module 218 therefore resets a counter, the noise module 210 resets the accumulated PCV pressure difference, and the signal module 186 resets the accumulated PCV pressure at 308. Control then returns to 304.

At 312, the signal module 186 may add the PCV pressure 170 to the accumulated PCV pressure, and the noise module 210 may add the PCV pressure difference 206 to the accumulated PCV pressure difference. Also at 312, the averaging module 238 may add the engine speed 182 to the accumulated engine speed, and the diagnostic value module 218 may increment the counter. As such, the counter value tracks the number of consecutive samples of the PCV pressure 170 and the engine speed 182 for which the diagnostic module 130 has been enabled.

At 316, the signal module 186, the noise module 210, and the averaging module 238 may determine whether the counter value is greater than a predetermined value. For example, the predetermined value may be 100, less than 100, or greater than 100. If 316 is false, control waits for the next PCV pressure 170 and the next engine speed 182 to be generated at 320. Control then returns to 304. If 316 is true, control continues with 324. While use of the counter is provided as an example, a timer may be used and signal and noise values 190 and 214 may be determined based on the samples generated while the diagnostic module 130 is enabled for at least a predetermined period. The predetermined period may be, for example, 1 second, less than 1 second, or greater than 1 second.

At 324, the averaging module 238 determines the average engine speed 234. For example, the averaging module 238 may divide the accumulated engine speed by the counter value to determine the average engine speed 234. Also at 324, the signal module 186 determines the signal value 190. For example, the signal module 186 may divide the accumulated PCV pressure by the counter value to determine an average PCV pressure and set the signal value 190 equal to or based on the average PCV pressure. Also at 324, the noise module 210 determines the noise value 214. For example, the noise module 210 may divide the accumulated PCV pressure difference by the counter value to determine an average PCV pressure difference and set the noise value 214 equal to or based on the average PCV pressure difference. The gain module 230 may also determine the gain value 226 based on the average engine speed 234 at 324.

At 328, the diagnostic value module 218 determines the diagnostic value 222. In the example of using fixed predetermined minimum and maximum values to determine whether the fault is present in the PCV system 36, the diagnostic value module 218 may set the diagnostic value 222 based on or equal to a product of the signal value 190, the noise value 214, and the gain value 226. Alternatively, the diagnostic value module 218 may set the diagnostic value 222 based on or equal to the signal value 190 plus a product of the noise value 214 and the gain value 226. The diagnostic value module 218 may also apply a filter, such as a low pass filter, to the value resulting from the multiplication or the summation to produce the diagnostic value 222.

In the example of using variable predetermined minimum and maximum values to determine whether the fault is present in the PCV system 36, the fault module 242 may determine the predetermined minimum and maximum values based on the average engine speed 234. The diagnostic value module 218 may set the diagnostic value 222 based on or equal to a product of the signal value 190 and the noise value 214. Alternatively, the diagnostic value module 218 may set the diagnostic value 222 based on or equal to the signal value 190 plus the noise value 214. The diagnostic value module 218 may also apply a filter, such as a low pass filter, to the value resulting from the multiplication or the summation to produce the diagnostic value 222.

At 332, the fault module 242 determines whether the diagnostic value 222 is greater than the predetermined maximum value or less than the predetermined minimum value. In other words, the fault module 242 determines whether the diagnostic value 222 is outside of a predetermined range (bounded by the predetermined maximum and minimum values) at 332. If 332 is false, the fault module 242 indicates that the fault is not present in the PCV system 36 at 336, and control may end (e.g., until a next key on event of the vehicle). If 332 is true, the fault module 242 indicates that the fault is present in the PCV system 36 at 340 and control may end (e.g., until a next key on event of the vehicle). For example, the fault module 242 may store the DTC associated with the fault in the PCV system 36 in the memory 246 at 340. Additionally or alternatively, the fault module 242 may illuminate the MIL 90 within the passenger cabin at 340.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any one embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A fault diagnostic system of a vehicle, comprising:
   a noise module that determines a noise value based on a plurality of differences between samples of a pressure signal generated by a pressure sensor located in a positive crankcase ventilation (PCV) system of an engine;
   a signal module that determines a signal value based on the samples of the pressure signal generated by the pressure sensor located in the PCV system of the engine;
   a diagnostic value module that determines a diagnostic value based on one of:
      (i) a product of the noise value and the signal value; and
      (ii) a sum based on the noise value and the signal value; and
   a fault module that selectively diagnoses a fault in the PCV system based on the diagnostic value and that generates a malfunction indicator within a passenger cabin of the vehicle in response to the diagnosis of the fault in the PCV system.

2. The fault diagnostic system of claim 1 wherein the fault in the PCV system includes at least one of:
   one of a leak in the PCV system; and
   a disconnection of the PCV system from at least one of a crankcase of the engine and an air intake system of the engine.

3. The fault diagnostic system of claim 1 wherein the signal module sets the signal value based on an average of the samples of the pressure signal generated by the pressure sensor located in the PCV system.

4. The fault diagnostic system of claim 1 wherein the noise module sets the noise value based on an average of the differences between the samples of the pressure signal generated by the pressure sensor located in the PCV system.

5. The fault diagnostic system of claim 1 wherein the fault module diagnoses the fault in the PCV system when the diagnostic value is one of: greater than a first predetermined value; and less than a second predetermined value.

6. The fault diagnostic system of claim 1 further comprising a gain module that determines a gain value based on an average engine speed,
   wherein the diagnostic value module determines the diagnostic value based on a product of the noise value, the signal value, and the gain value.

7. The fault diagnostic system of claim 1 further comprising a gain module that determines a gain value based on an average engine speed,
   wherein the diagnostic value module determines the diagnostic value based on a sum of (i) the signal value and (ii) a product of the noise value and the gain value.

8. The fault diagnostic system of claim 1 wherein the noise module:
   determines squares of the differences between the samples of the pressure signal generated by the pressure sensor located in the PCV system;
   determines a second sum of the squares of the differences; and
   sets the noise value based on a square root of the second sum.

9. The fault diagnostic system of claim 1 wherein the noise module sets the noise value based on absolute values of the differences between the samples of the pressure signal generated by the pressure sensor located in the PCV system.

10. The fault diagnostic system of claim 1 wherein, in response to the diagnosis of the fault in the PCV system, the fault module further stores a diagnostic trouble code (DTC) in memory, the DTC being associated with the fault in the PCV system.

11. A fault diagnostic method for a vehicle, comprising:
    determining a noise value based on a plurality of differences between samples of a pressure signal generated by a pressure sensor located in a positive crankcase ventilation (PCV) system of an engine;
    determining a signal value based on the samples of the pressure signal generated by the pressure sensor located in the PCV system of the engine;
    determining a diagnostic value based on one of:
       (i) a product of the noise value and the signal value; and
       (ii) a sum based on the noise value and the signal value;
    selectively diagnosing a fault in the PCV system based on the diagnostic value; and
    generating a malfunction indicator within a passenger cabin of the vehicle in response to the diagnosis of the fault in the PCV system.

12. The fault diagnostic method of claim 11 wherein the fault in the PCV system includes at least one of:
    one of a leak in the PCV system; and
    a disconnection of the PCV system from at least one of a crankcase of the engine and an air intake system of the engine.

13. The fault diagnostic method of claim 11 wherein setting the signal value includes setting the signal value based on an average of the samples of the pressure signal generated by the pressure sensor located in the PCV system.

14. The fault diagnostic method of claim 11 wherein setting the noise value includes setting the noise value based on an average of the differences between the samples of the pressure signal generated by the pressure sensor located in the PCV system.

15. The fault diagnostic method of claim 11 wherein diagnosing the fault in the PCV system includes diagnosing the fault in the PCV system when the diagnostic value is one of: greater than a first predetermined value; and less than a second predetermined value.

16. The fault diagnostic method of claim 11 further comprising:
  determining a gain value based on an average engine speed,
  wherein determining the diagnostic value includes determining the diagnostic value based on a product of the noise value, the signal value, and the gain value.

17. The fault diagnostic method of claim 11 further comprising:
  determining a gain value based on an average engine speed,
  wherein determining the diagnostic value includes determining the diagnostic value based on a sum of (i) the signal value and (ii) a product of the noise value and the gain value.

18. The fault diagnostic method of claim 11 wherein setting the noise value includes:
  determining squares of the differences between the samples of the pressure signal generated by the pressure sensor located in the PCV system;
  determining a second sum of the squares of the differences; and
  setting the noise value based on a square root of the second sum.

19. The fault diagnostic method of claim 11 wherein setting the noise value includes setting the noise value based on absolute values of the differences between the samples of the pressure signal generated by the pressure sensor located in the PCV system.

20. The fault diagnostic method of claim 11 further comprising, in response to the diagnosis of the fault in the PCV system, storing a diagnostic trouble code (DTC) in memory, the DTC being associated with the fault in the PCV system.

* * * * *